United States Patent
Cheng et al.

(10) Patent No.: US 8,745,180 B2
(45) Date of Patent: Jun. 3, 2014

(54) METHOD FOR DYNAMICALLY ADJUSTING NETWORK PARAMETERS OF A MOBILE TERMINAL BROWSER AND MOBILE TERMINAL

(75) Inventors: Qun Cheng, Shenzhen (CN); Min Jiang, Shenzhen (CN); Xueji Jin, Shenzhen (CN); Dan Xue, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 153 days.

(21) Appl. No.: 13/258,430

(22) PCT Filed: Apr. 19, 2010

(86) PCT No.: PCT/CN2010/071893
§ 371 (c)(1),
(2), (4) Date: May 3, 2012

(87) PCT Pub. No.: WO2010/145296
PCT Pub. Date: Dec. 23, 2010

(65) Prior Publication Data
US 2012/0209969 A1    Aug. 16, 2012

(30) Foreign Application Priority Data
Nov. 4, 2009    (CN) .......................... 2009 1 0209494

(51) Int. Cl.
*G06F 15/177*    (2006.01)
*G06F 15/16*    (2006.01)
*G06F 17/30*    (2006.01)

(52) U.S. Cl.
CPC .... *G06F 17/30861* (2013.01); *G06F 17/30899* (2013.01)
USPC .......................................... 709/221; 709/233

(58) Field of Classification Search
CPC .......... G06F 17/30861; G06F 17/3089; G06F 17/30899
USPC .......................................... 709/221, 232–235
See application file for complete search history.

(56) References Cited

U.S. PATENT DOCUMENTS

| 5,724,514 A | 3/1998 | Arias |
| 6,070,195 A | 5/2000 | Yamamoto |

(Continued)

FOREIGN PATENT DOCUMENTS

| CN | 1571298 A | 1/2005 |
| CN | 101335595 A | 12/2008 |

(Continued)

OTHER PUBLICATIONS

International Search Report in international application No. PCT/CN2010/071893, mailed on Aug. 12, 2010.

(Continued)

*Primary Examiner* — Jeong S Park
(74) *Attorney, Agent, or Firm* — Oppedahl Patent Law Firm LLC

(57) ABSTRACT

The disclosure discloses a method for adjusting a mobile terminal browser, which comprises setting an upper threshold value and a lower threshold value of a downloading speed for a mobile terminal browser. The method further comprises: calculating a current average downloading speed of the mobile terminal browser; comparing the current average downloading speed with the upper threshold value and the lower threshold value of the downloading speed; resetting network parameters of the mobile terminal browser when the current average downloading speed is less than the lower threshold value of the downloading speed or greater than the upper threshold value of the downloading speed. The disclosure also discloses a mobile terminal. The disclosure optimizes the network parameters of the mobile terminal browser according to the current network environment, and simultaneously increases downloading efficiency and stability of the mobile terminal browser, thereby avoiding the process of manually setting the relative network parameters of the browser by a mobile terminal user according to different network environments, so that the browser is more humanized and user experience is greatly improved.

8 Claims, 2 Drawing Sheets

(56) References Cited

U.S. PATENT DOCUMENTS

| | | |
|---|---|---|
| 6,223,221 B1 | 4/2001 | Kunz |
| 6,754,700 B1 | 6/2004 | Gordon et al. |
| 2002/0091825 A1* | 7/2002 | Shuster ................... 709/226 |
| 2005/0138140 A1* | 6/2005 | Wen et al. ................ 709/217 |
| 2006/0259585 A1* | 11/2006 | Keohane et al. ........... 709/219 |
| 2008/0151866 A1 | 6/2008 | Wu |
| 2008/0285496 A1* | 11/2008 | Fuchs et al. .............. 370/311 |
| 2009/0083402 A1 | 3/2009 | Jung |

FOREIGN PATENT DOCUMENTS

| | | |
|---|---|---|
| CN | 101415258 A | 4/2009 |
| CN | 101416466 A | 11/2013 |
| WO | 0129701 A2 | 4/2001 |

OTHER PUBLICATIONS

English Translation of the Written Opinion of the International Search Authority in international application No. PCT/CN2010/071893, mailed on Aug. 12, 2010.

Supplementary European Search Report in European application No. 10788692.1, mailed on Oct. 30, 2013.

* cited by examiner

METHOD FOR DYNAMICALLY ADJUSTING NETWORK PARAMETERS OF A MOBILE TERMINAL BROWSER AND MOBILE TERMINAL

TECHNICAL FIELD

The disclosure relates to the technology of setting network parameters of a mobile terminal browser, more particularly to a method for adjusting a mobile terminal browser and to a mobile terminal.

BACKGROUND

With the arrival of 3rd Generation (3G) mobile communication era, application of Internet is gradually transplanted to a mobile phone. A corresponding browser is bound to be set on the mobile phone in order to transplant the Internet to the mobile phone, because a user cannot access the Internet without a browser. At present, various parameters of various mobile terminal browsers developed newly are optimized, so performance of the browsers, such as downloading efficiency, user experience and the like, are improved.

When a network environment goes through a radical change, such as entering a subway or an elevator from the ground, the network environment will rapidly deteriorate, which may possibly result in browser connection failure and sharp decrease of currently acquired data efficiency. Furthermore, it is in a transition age from 2nd Generation (2G) to the 3G network currently, when the user enters the 3G network from the 2G network, the user experience is bound to be affected if the browser cannot adaptively switch to the 3G network in real time and has to be switch manually by the user.

Network parameters of the present browser are configured in one time when starting the browser through reading a default configuration file of the browser, including parameters that can be modified by the user, such as an image switch and the like, and also including parameters that cannot be modified by the user, such as image downloading priority, a number of tasks downloaded simultaneously and the like. The parameters that can be modified by the user are needed to be modified by the user manually, while the parameters that cannot be modified by the user are the same in all the network environments, which will obviously affect the performance of the browser in different network environments.

A Chinese patent application document, of which publication date is Apr. 22, 2009 and publication number is CN101416466A, discloses a technical solution of 'optimizing network protocol options through enhancing learning and communication'. Wherein, however, only an adaptive network environment of a server end is described and analyzed in detail, the relative technology of a client end of the adaptive network environment, such as a mobile terminal browser, is absent.

SUMMARY

In view of this, the disclosure mainly aims to provide a method for adjusting a mobile terminal browser and a mobile terminal, which can adaptively adjust network parameters of the mobile terminal browser according to quality of a current network so as to improve user experience.

To achieve the above purposes, the technical solution of the disclosure is realized as follows.

A method for adjusting a mobile terminal browser includes: setting an upper threshold value and a lower threshold value of a downloading speed for a mobile terminal browser, and the method further includes:

calculating a current average downloading speed of the mobile terminal browser; comparing the current average downloading speed with the upper threshold value and the lower threshold value of the downloading speed; resetting network parameters of the mobile terminal browser when the current average downloading speed is less than the lower threshold value of the downloading speed or greater than the upper threshold value of the downloading speed.

Preferably, the step of calculating a current average downloading speed of the mobile terminal browser may include:

classifying resources in a webpage downloaded by the mobile terminal browser; calculating a downloading speed of each type of resources respectively; and taking an average value of the downloading speed of each type of resources as the current average downloading speed.

Preferably, the step of calculating a downloading speed of each type of resources may include:

recording a downloading start time of each specific resource in each type of resources; acquiring a data size downloaded currently of each specific resource, dividing the acquired data size by a difference value between the current time and the start time of each specific resource respectively to obtain the downloading speed of each specific resource; and taking an average value of the downloading speeds of the specific resources as the downloading speed of the type of the resources.

Preferably, the network parameters may include: downloading priority of webpage resources, and/or a downloading timing interval, and/or downloading timeout of each resource, and/or a number of downloading tasks supported currently.

Preferably, the step of resetting network parameters of the mobile terminal browser may include:

when the current average downloading speed is less than the lower threshold value of the downloading speed, setting downloading priority of image and/or flash resources in the webpage to be lowest, or setting to stop downloading the image and/or flash resources, and setting priority of text and JavaScript resources in the webpage to be highest, and/or prolonging the downloading timing interval, and/or prolonging the resource timeout, and/or reducing the number of the simultaneously downloading tasks supported currently; and when the current average downloading speed is greater than the upper threshold value of the downloading speed, increasing the downloading priority of the image and/or flash resources in the webpage, or setting the image and/or flash resources, the downloading of which has been stopped to allow downloading, and/or shortening the downloading timing interval, and/or shortening the timeout, and/or increasing the number of the simultaneously downloading tasks supported currently.

A mobile terminal includes:

a first setting module is configured to set an upper threshold value and a lower threshold value of a downloading speed for a mobile terminal browser;

a calculating module is configured to calculate a current average downloading speed of the mobile terminal browser;

a comparing module is configured to compare the current average downloading speed with the upper threshold value and the lower threshold value of the downloading speed, and trigger a second setting module when the current average downloading speed is less than the lower threshold value of the downloading speed or greater than the upper threshold value of the downloading speed; and a second setting module is configured to reset network parameters of the mobile terminal browser.

Preferably, the calculating module may further include:

a classifying submodule is configured to classify resources in a webpage downloaded by the mobile terminal browser; and a calculating submodule is configured to calculate a downloading speed of each type of resources respectively, and take an average value of the downloading speed of each type of resources as the current average downloading speed.

Preferably, the calculating submodule may be further configured to calculating a downloading speed of each type of resources, which may include: recording a downloading start time of each specific resource in each type of resources; acquiring a data size downloaded currently of each specific resource, dividing the acquired data size by a difference value between the current time and the start time of each specific resource respectively to obtain the downloading speed of each specific resource; and taking an average value of the downloading speeds of the specific resources as the downloading speed of the type of the resources.

Preferably, the network parameters may include: downloading priority of webpage resources, and/or a downloading timing interval, and/or timeout, and/or a number of downloading tasks supported currently.

Preferably, the second setting module may be further configured to set network parameters of the mobile terminal browser, which may include: when the current average downloading speed is less than the lower threshold value of the downloading speed, setting downloading priority of image and/or flash resources in the webpage to be lowest, or setting to stop downloading the image and/or flash resources, and setting priority of text and JavaScript resources in the webpage to be highest, and/or prolong the downloading timing interval, and/or prolong the timeout, and/or reducing the number of the downloading tasks supported currently; and when the current average downloading speed is greater than the upper threshold value of the downloading speed, increasing the downloading priority of the image and/or flash resources in the webpage, or setting the image and/or flash resources, the downloading of which has been stopped to allow downloading, and/or shortening the downloading timing interval, and/or shortening the timeout, and/or increasing the number of the downloading tasks supported currently.

In the disclosure, the threshold value of the data downloading speed of the mobile terminal browser is set, and the current average downloading speed of the mobile terminal browser is calculated in real time, and then compared with the set threshold value of the downloading speed; when the current average downloading speed exceeds the set threshold value of the downloading speed, various network parameters of the mobile terminal browser (such as the number of the downloading tasks, the task timeout, downloading priority of large-sized resources such as image and the like, the interior downloading timing interval of the browser and the like) are dynamically adjusted. In this way, the network parameters of the mobile terminal browser are optimized according to the current network environment, downloading efficiency and stability of the mobile terminal browser are increased, and the process of manually setting the relative network parameters of the browser by the mobile terminal user according to different network environments is avoided, so that the browser is more humanized and user experience is greatly improved.

DETAILED DESCRIPTION

The basic idea of the disclosure is that: a threshold value of a data downloading speed of a mobile terminal browser is set, and a current average downloading speed of the mobile terminal browser is calculated in real time and then compared with the set threshold value of the downloading speed; when the current average downloading speed exceeds the set threshold value of the downloading speed, various network parameters of the mobile terminal browser (such as a number of downloading tasks, task timeout, downloading priority of large-sized resources such as image and the like, an interior downloading timing interval of the browser and the like) are dynamically adjusted. In this way, the network parameters of the mobile terminal browser are optimized according to a current network environment, downloading efficiency and stability of the mobile terminal browser can be improved, and the process of manually setting the relative network parameters of the browser by a mobile terminal user according to different network environments can be avoided, so that the browser is more humanized and user experience is greatly improved.

To clarify the purpose, technical solution and advantages of the disclosure, the disclosure is described in detail with reference to embodiments and drawings.

Figure 1:
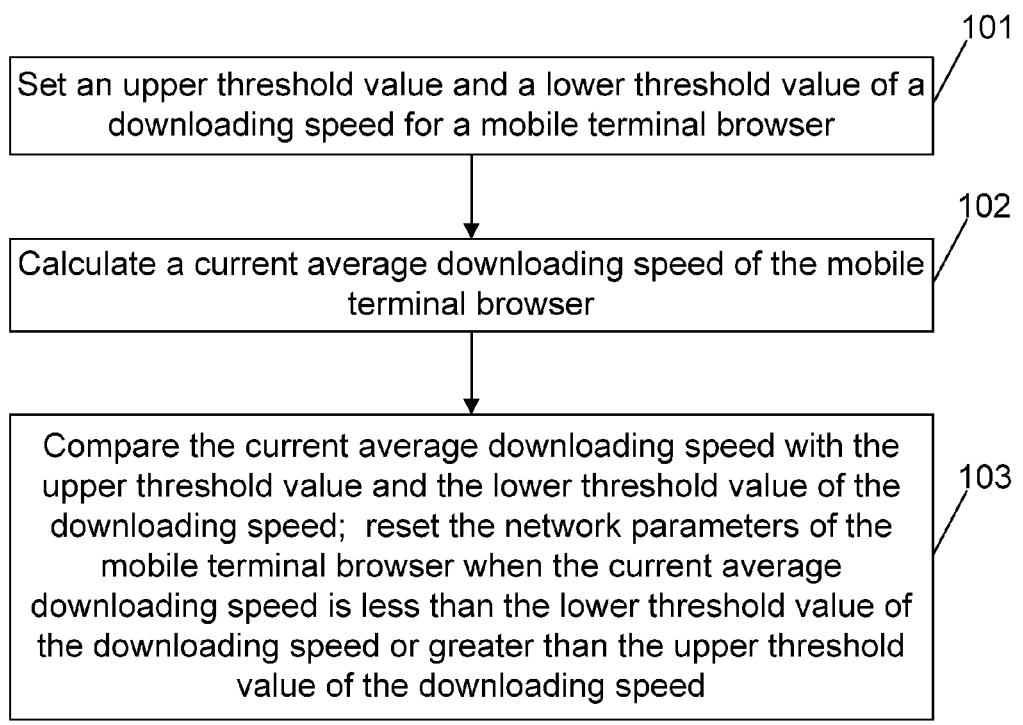
FIG. 1 shows a flowchart of a method for adjusting a mobile terminal browser according to the disclosure.

FIG. 1 shows a flowchart of a method for adjusting a mobile terminal browser according to the disclosure. As shown in FIG. 1, the method for adjusting a mobile terminal browser according to the disclosure includes the following steps.

Step 101: setting an upper threshold value and a lower threshold value of a downloading speed for a mobile terminal browser.

Here, the upper threshold value and the lower threshold value of the downloading speed of the mobile terminal browser are determined mainly according to a bandwidth supported by different types of networks. There is a great gap between the network speed under different network environments, so the upper threshold value and the lower threshold value of the downloading speed are adaptively set according to different network environments. The threshold value is an experience value. Assuming that the mobile terminal user accesses Internet via CMWAP of China Mobile, and an average speed of CMWAP service is 5 kb/s, then the lower threshold value of the downloading speed can be set to be 20% of the average speed; in the downloading process, if the average speed is less than 1 kb/s, the network environment is considered to be poor, and the network parameters should be adaptively set for the mobile terminal browser under poor network condition; similarly, the upper threshold value of the downloading speed can be set to be 180% of the average speed, namely if up to 9 kb/s, then the network environment is considered to be very good, so the network parameters should be adaptively set for the mobile terminal browser under good network condition.

Step 102: calculating a current average downloading speed of the mobile terminal browser.

When the mobile terminal user accesses Internet via the mobile terminal browser, it reads initial default network parameter configuration of the mobile terminal browser. The network parameters in the disclosure include: downloading priority of webpage resources, and/or a downloading timing interval, and/or downloading timeout of each resource, and/or a number of downloading tasks supported currently and the like. The network parameter default configuration of the mobile terminal browser is assumed as follows: image downloading is opened and the priority is medium for the user settable part; the maximum number of tasks downloaded simultaneously is 5, and the downloading timing interval is 60 seconds for the user non-settable part.

After the user starts to download a webpage by using the mobile terminal browser, the current average downloading speed is calculated at a set duration interval; and the duration interval can be set according to a processing capability of the mobile terminal, for example, the duration can be 1 minute, 30 seconds, 5 minutes and the like.

Specifically, in the process of downloading webpage resources by the mobile terminal browser, the downloaded data size is acquired at fixed time, which is then divided by the duration it takes. However, the average speed obtained by the method is the average speed of the entire downloading process; when the network environment changes, the changes cannot be reflected in time, and furthermore, when the speed exceeds the threshold value, it is not beneficial to the adaptive setting of the network parameters of the mobile terminal browser. In the disclosure, the webpage resources are classified, the downloading speed of different types of webpage resources is calculated respectively, and the current average downloading speed is determined according to the downloading speed of various types of webpage resources.

A general webpage consists of a plurality of resources, including a text, an image, JavaScript, a Cascading Style Sheet (CSS), a flash and the like. The calculating method of the disclosure refers to calculating the average speed at different times of the downloading process according to the downloading progress of each resource in the entire webpage, so as to reflect the current network environment state in time, thereby providing more accurate basis for adjusting the network parameters of the mobile terminal browser. In the disclosure, the average downloading speed is calculated through calculating the current downloading speed of each resource, and the specific calculating method includes: storing a downloading start time of each resource in each type of resources according to the resource type; when acquiring data during downloading resources, re-calling a time function to obtain a downloading finish time of each resource; subtracting the starting time from the downloading finish time to obtain duration for downloading the resource; dividing the currently acquired data size of the resource by the duration for downloading the resource to obtain a current average speed for downloading the resource; and storing the average speed. The downloading average speeds of all the resources are obtained in the above way.

An average value of the current average speeds for downloading each resource is taken as the current downloading speed of the mobile terminal browser.

Step 103: comparing the current average downloading speed with the upper threshold value and the lower threshold value of the downloading speed; resetting the network parameters of the mobile terminal browser when the current average downloading speed is less than the lower threshold value of the downloading speed or greater than the upper threshold value of downloading speed.

In this step, the network parameters of the mobile terminal browser are modified according to the current average speed. Specifically, when the current average speed is less than the lower threshold value of the downloading speed, the step of setting the network parameters of the browser includes the following operation:

firstly, setting the downloading priority of large-sized resources, such as an image or/and a flash and the like, to be lowest, even setting to stop downloading image resources, so resources closely related to the page content layout, such as a text, JavaScript and the like, can be downloaded preferentially, thereby increasing a display speed of the mobile terminal browser, reducing the time of the user for waiting for page display, and improving user experience;

secondly, reducing the number of tasks downloaded simultaneously from 5 to 3, or even less; when the number of the current tasks is greater than 3, reducing the number of tasks refers to not starting a new task when completing a current task until the number of the current tasks is less than 3, rather than directly completing a certain task being performed currently; in this way, stability of the mobile terminal browser can be improved, and the task timeout probability caused by multi-task can be reduced; and finally, prolonging the downloading timing interval, for example prolonging to 90 seconds from the previous 60 seconds of default setting; the downloading timing interval is prolonged mainly for avoiding page content loss of a larger resource caused by incomplete downloading, in particular when accessing a large portable website via a wireless network.

When the current average speed is greater than the upper threshold value of downloading speed, the step of setting the network parameters of the browser includes the following operation: increasing the downloading priority of image or flash resources in the webpage, for example, setting the downloading priority of image or flash resources from 'intermediate' to 'advanced', or setting the image or flash resources, the downloading of which has been stopped to allow downloading; shortening the downloading timing interval, for example setting from the previous 60 seconds to 45 seconds; increasing the number of the downloading tasks supported currently, for example setting the number of the downloading tasks from the previous 5 to 6.

Figure 2:
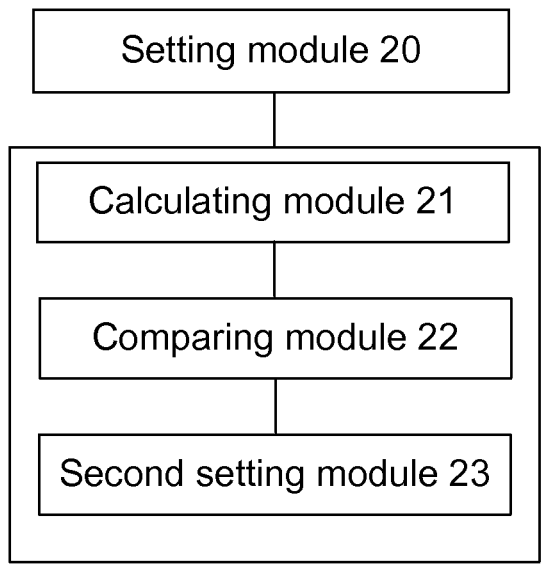
FIG. 2 shows a schematic diagram of a composition structure of a mobile terminal with a browser according to the disclosure.

FIG. 2 shows a schematic diagram of a composition structure of a mobile terminal with a browser according to the disclosure. As shown in FIG. 2, the mobile terminal of the disclosure includes: a first setting module 20, a calculating module 21, a comparing module 22 and a second setting module 23. Wherein the first setting module 20 is configured to set an upper threshold value and a lower threshold value of a downloading speed for a mobile terminal browser; the calculating module 21 is configured to calculate a current average downloading speed of the mobile terminal browser; the comparing module 22 is configured to compare the current average downloading speed with the upper threshold value and the lower threshold value of the downloading speed, and trigger the second setting module 23 when the current average downloading speed is less than the lower threshold value of the downloading speed or greater than the upper threshold value of the downloading speed; the second setting module 23 is configured to reset network parameters of the mobile terminal browser. Wherein the network parameters include: downloading priority of webpage resources, and/or a downloading timing interval, and/or downloading timeout of each resource, and/or a number of downloading tasks supported currently. The step of setting the network parameters of the mobile terminal browser by the second setting module 23 includes:

when the current average downloading speed is less than the lower threshold value of the downloading speed, setting the downloading priority of the image or flash resources in the webpage to be lowest, or setting to stop downloading the image or flash resources, and setting the priority of the text and JavaScript resources in the webpage to be highest, and/or prolonging the downloading timing interval, and/or prolonging the timeout, and/or reducing the number of the downloading tasks supported currently;

when the current average downloading speed is greater than the upper threshold value of the downloading speed, increasing the downloading priority of the image or flash resources in the webpage, or setting the image or flash resources, the downloading of which has been stopped to allow downloading, and/or shortening the downloading timing interval, and/or shortening the timeout, and/or increasing the number of the downloading tasks supported currently.

Figure 3:
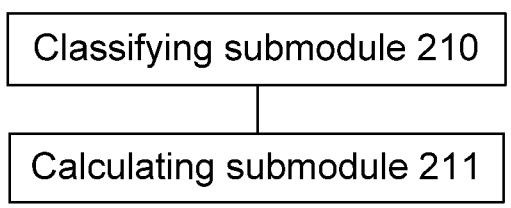
FIG. 3 shows a schematic diagram of a composition structure of a calculating module of a mobile terminal with a browser according to the disclosure.

FIG. 3 shows a schematic diagram of a composition structure of a calculating module of a mobile terminal with a browser according to the disclosure. As shown in FIG. 3, the calculating module 21 of the disclosure includes a classifying submodule 210 and a calculating submodule 211. Wherein the classifying submodule 210 is configured to classify resources in a webpage downloaded by the mobile terminal browser; the calculating submodule 211 is configured to calculate a downloading speed of each type of resources respectively, and take an average value of the downloading speed of each type of resources as the current average downloading speed. The step of calculating the downloading speed of each type of resources by the calculating submodule 211 includes: recording a downloading start time of each specific resource in each type of resources; acquiring a data size downloaded currently of each specific resource, dividing it by a difference value between the current time and the start time of each specific resource respectively to obtain the downloading speed of each specific resource; and taking the average value of the downloading speeds of the specific resources as the downloading speed of the resources. The resources which have been already downloaded are not included in the statistics, and if the resource hasn't been downloaded, the current time is set as the initial time of the resource.

Those skilled in the art should understand that, the mobile terminal shown in FIG. 2 is set for implementing the method for adjusting a mobile terminal browser. The functions of each processing modules and each submodule in the system shown in FIG. 2 can be interpreted with reference to the description of the method for adjusting a mobile terminal browser, and the functions of each processing modules and each submodule can be implemented through programs running on the processor, or can be implemented through a specific logic circuit.

The above is only preferred embodiments of the disclosure and not intended to limit the protection scope of the disclosure.

What is claimed is:

1. A method for dynamically adjusting network parameters of a mobile terminal browser, comprising: setting an upper threshold value and a lower threshold value of a downloading speed for a mobile terminal browser, and further comprising:
calculating a current average downloading speed of the mobile terminal browser; comparing the current average downloading speed with the upper threshold value and the lower threshold value of the downloading speed; and resetting network parameters of the mobile terminal browser when the current average downloading speed is less than the lower threshold value of the downloading speed or greater than the upper threshold value of the downloading speed;

wherein, the network parameters comprise at least one of the following: downloading priority of webpage resources, a downloading timing interval, downloading timeout of each resource, and a number of downloading tasks supported currently.

2. The method according to claim 1, wherein the step of calculating a current average downloading speed of the mobile terminal browser comprises:
classifying resources in a webpage downloaded by the mobile terminal browser; calculating a downloading speed of each type of resources respectively; and taking an average value of the downloading speed of each type of resources as the current average downloading speed.

3. The method according to claim 2, wherein the step of calculating a downloading speed of each type of resources comprises:
recording a downloading start time of each specific resource in each type of resources; acquiring a data size downloaded currently of the each specific resource, dividing the acquired data size by a difference value between the current time and the start time of the each specific resource respectively to obtain a downloading speed of the each specific resource; and taking an average value of the downloading speeds of the specific resources as the downloading speed of the type of resources.

4. The method according to claim 1, wherein the step of resetting network parameters of the mobile terminal browser comprises:
when the current average downloading speed is less than the lower threshold value of the downloading speed, setting downloading priority of image and/or flash resources in the webpage to be lowest, or setting to stop downloading the image and/or flash resources, and setting priority of text and JavaScript resources in the webpage to be highest, and/or prolonging the downloading timing interval, and/or prolonging the resource timeout, and/or reducing the number of the simultaneously downloading tasks supported currently; and when the current average downloading speed is greater than the upper threshold value of the downloading speed, increasing the downloading priority of the image and/or flash resources in the webpage, or setting the image and/or flash resources, the downloading of which has been stopped to allow downloading, and/or shortening the downloading timing interval, and/or shortening the timeout, and/or increasing the number of the simultaneously downloading tasks supported currently.

5. A mobile terminal with a browser, the mobile terminal comprising one or more processors for implementing:
a first setting module is configured to set an upper threshold value and a lower threshold value of a downloading speed for a mobile terminal browser;
a calculating module is configured to calculate a current average downloading speed of the mobile terminal browser;
a comparing module is configured to compare the current average downloading speed with the upper threshold value and the lower threshold value of the downloading speed, and trigger the second setting module when the current average downloading speed is less than the lower threshold value of the downloading speed or greater than the upper threshold value of the downloading speed; and
a second setting module is configured to reset network parameters of the mobile terminal browser;
wherein, the network parameters comprise at least one of the following: downloading priority of webpage resources, a downloading timing interval, downloading timeout of each resource, and a number of downloading tasks supported currently.

6. The mobile terminal according to claim 5, wherein the one or more processors are further configured to implement a classifying submodule and a calculating submodule, wherein, the classifying submodule is configured to classify resources in a webpage downloaded by the mobile terminal browser; and the calculating submodule is configured to calculate a downloading speed of each type of resources respectively, and take an average value of the downloading speed of each type of resources as the current average downloading speed.

7. The mobile terminal according to claim 6, wherein the calculating submodule implemented by the one or more processors is further configured to record a downloading start time of each specific resource in each type of resources, acquire a data size downloaded currently of the each specific resource, divide the acquired data size by a difference value between the current time and the start time of the each specific resource respectively to obtain a downloading speed of each specific resource, and take an average value of the downloading speeds of specific resources as the downloading speed of the type of resources.

8. The mobile terminal according to claim 5, wherein the second setting module implemented by the one or more processors is further configured to, when the current average downloading speed is less than the lower threshold value of the downloading speed, set downloading priority of image and/or flash resources in the webpage to be lowest, or set to stop downloading the image and/or flash resources, and set priority of text and JavaScript resources in the webpage to be highest, and/or prolong the downloading timing interval, and/or prolong the timeout, and/or reduce the number of the downloading tasks supported currently; and the second setting module implemented by the one or more processors is further configured to, when the current average downloading speed is greater than the upper threshold value of the downloading speed, increase the downloading priority of the image and/or flash resources in the webpage, or set the image and/or flash resources, the downloading of which has been stopped to allow downloading, and/or shorten the downloading timing interval, and/or shorten the timeout, and/or increase the number of the downloading tasks supported currently.

* * * * *